United States Patent
Li et al.

(10) Patent No.: US 11,071,058 B2
(45) Date of Patent: Jul. 20, 2021

(54) METHOD AND APPARATUS FOR LOW POWER DEVICE SYNCHRONIZATION

(71) Applicant: ZTE CORPORATION, Guangdong (CN)

(72) Inventors: Nan Li, Guangdong (CN); Kaiying Lv, Guangdong (CN); Ning Wei, Guangdong (CN); Zhiqiang Han, Guangdong (CN); Bo Sun, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 16/582,872

(22) Filed: Sep. 25, 2019

(65) Prior Publication Data
US 2020/0092807 A1  Mar. 19, 2020

Related U.S. Application Data

(63) Continuation of application No. PCT/CN2017/078974, filed on Mar. 31, 2017.

(51) Int. Cl.
*H04W 52/02* (2009.01)
*H04W 56/00* (2009.01)

(52) U.S. Cl.
CPC ... *H04W 52/0216* (2013.01); *H04W 52/0229* (2013.01); *H04W 56/001* (2013.01)

(58) Field of Classification Search
CPC .................. H04W 52/0216; H04W 56/001
See application file for complete search history.

(56) References Cited

U.S. PATENT DOCUMENTS

| | | | | |
|---|---|---|---|---|
| 5,376,975 | A * | 12/1994 | Romero | H04W 52/0232 340/7.34 |
| 6,968,219 | B2 * | 11/2005 | Pattabiraman | H04W 52/0216 455/574 |
| 7,463,599 | B2 * | 12/2008 | Lindoff | H04W 68/00 370/311 |
| 8,355,380 | B1 * | 1/2013 | Banerjea | H04W 40/10 370/331 |

(Continued)

FOREIGN PATENT DOCUMENTS

CN  105554863 A  5/2016

OTHER PUBLICATIONS

Machine translation copy :CN105554863A (claims and description) (Year: 2016).*

(Continued)

*Primary Examiner* — Parth Patel
(74) *Attorney, Agent, or Firm* — Duane Morris LLP

(57) ABSTRACT

A method and system for performing low power synchronization between to communication nodes is disclosed herein. In one embodiment, a method performed by a first wireless communication node includes: determining a wake up window start time and duration of a second wireless communication node; and transmitting at least one signal to the second wireless communication node during the determined wake up window, the at least one signal comprising at least one synchronization sequence, wherein the at least one synchronization sequence is configured to enable the second wireless communication node to adjust its wake up window timing.

30 Claims, 8 Drawing Sheets

(56) References Cited

U.S. PATENT DOCUMENTS

| | | | |
|---|---|---|---|
| 8,385,985 B2* | 2/2013 | Burke | G06F 1/329 455/574 |
| 8,700,105 B2* | 4/2014 | Lee | H04W 52/0248 455/574 |
| 9,900,857 B2* | 2/2018 | Wang | H04W 56/0045 |
| 10,021,660 B2* | 7/2018 | Gupta | H04W 52/0216 |
| 10,588,139 B2* | 3/2020 | Elliott | H04W 72/1205 |
| 2006/0133408 A1* | 6/2006 | Nogueira-Nine | H04W 52/0219 370/447 |
| 2008/0085680 A1* | 4/2008 | Kim | H04W 56/0005 455/69 |
| 2009/0216100 A1* | 8/2009 | Ebner | A61M 5/1723 600/347 |
| 2009/0258661 A1* | 10/2009 | Tsai | H04W 68/025 455/458 |
| 2011/0059779 A1* | 3/2011 | Thomas | H04W 52/02 455/574 |
| 2011/0066297 A1* | 3/2011 | Saberi | F16K 31/046 700/287 |
| 2011/0074552 A1* | 3/2011 | Norair | G06K 7/0008 340/10.1 |
| 2011/0128869 A1* | 6/2011 | Coleri Ergen | H04W 56/002 370/252 |
| 2011/0150252 A1* | 6/2011 | Solum | H04L 7/0008 381/314 |
| 2013/0272180 A1* | 10/2013 | Hiremath | H04W 52/029 370/311 |
| 2014/0211697 A1* | 7/2014 | Ben-Eli | H04W 76/28 370/328 |
| 2014/0269669 A1* | 9/2014 | Newton | H04W 72/1242 370/350 |
| 2014/0300448 A1* | 10/2014 | Ochiai | G07C 9/00309 340/5.72 |
| 2016/0057722 A1* | 2/2016 | Premy | H04W 56/0015 370/315 |
| 2016/0073342 A1* | 3/2016 | Szewczyk | H04W 52/0216 370/311 |
| 2016/0135122 A1* | 5/2016 | Abraham | H04W 52/02 370/311 |
| 2016/0198404 A1* | 7/2016 | Tsiatsis | H04W 52/02 455/507 |
| 2016/0262202 A1* | 9/2016 | Gershoni | H04W 76/28 |
| 2016/0295511 A1* | 10/2016 | Qi | H04L 67/104 |
| 2016/0338143 A1* | 11/2016 | Johansson | H04W 52/0225 |
| 2017/0071022 A1* | 3/2017 | Sampath | H04W 48/18 |
| 2017/0257458 A1* | 9/2017 | Kim | H04W 88/02 |
| 2018/0020405 A1* | 1/2018 | Huang | H04W 52/0229 |
| 2018/0110000 A1* | 4/2018 | Shellhammer | H04W 52/0206 |
| 2018/0115952 A1* | 4/2018 | Shellhammer | H04W 52/0216 |
| 2018/0234918 A1* | 8/2018 | Asterjadhi | H04W 52/0229 |
| 2019/0191375 A1* | 6/2019 | Cheng | H04L 1/1607 |
| 2020/0014421 A1* | 1/2020 | Alexander | H04B 1/713 |
| 2020/0092806 A1* | 3/2020 | Lu | H04W 52/0216 |
| 2020/0092807 A1* | 3/2020 | Li | H04W 52/0216 |

OTHER PUBLICATIONS

International Search Report dated Jan. 8, 2018, in corresponding International Application No. PCT/CN2017/078974.

* cited by examiner

# METHOD AND APPARATUS FOR LOW POWER DEVICE SYNCHRONIZATION

CROSS-REFERENCE TO RELATED APPLICATION

The present application claims priority to PCT international application PCT/CN2017/078974, filed on Mar. 31, 2017, which is expressly incorporated by reference herein in its entirety.

TECHNICAL FIELD

The disclosure relates generally to wireless communications and, more particularly, to systems, methods and devices for performing lower power synchronization between two or more devices in a wireless communication network.

BACKGROUND

As the Internet of things (IoT) becomes a reality, a large number of IoT devices will require access to one or more communication networks, connected to each other through wired or wireless means. The IoT is expected to offer advanced connectivity of devices, systems, and services that go beyond machine-to-machine (M2M) communications and will implement a variety of protocols, domains, and applications. The interconnection of communication-enabled devices (i.e., "smart objects") is expected to usher in automation in a wider variety of fields, such as intelligent transportation, environmental protection, public security, smart Home, industrial monitoring, personal health, etc., while also enabling advanced applications like a smart grid, and smart cities. It is estimated that the IoT will consist of almost 50 billion interconnected things (i.e., communication-enabled objects) by 2020.

In a wireless communication network, such as a wireless local area network (WLAN), wireless communication nodes such as access points and stations can become IoT devices. An access point (AP) is the basic equipment in a wireless LAN that establishes a Basic Service Set (BSS), and a station (STA) typically establishes wireless communications with the AP through a predetermined association or registration procedure, and thereafter communicates with the AP for data transmission. In some types of networks such as ad-hoc networks, for example, an AP is typically not present in the network, and STA's can communicate directly with each other and other nodes. Therefore, for both independent BSS (IBSS) and BSS, both STA's and AP's can generally be referred to as wireless communication nodes herein.

In a WLAN, for example, STAs can be IoT devices such as sensors equipped with wireless communication modules. It is anticipated that a majority of IoT devices will be battery-powered and installed at locations that may be difficult or expensive to maintain or access on a frequent basis. Thus, it is desirable for such devices to maximize their battery life. To achieve this purpose, when the STA is in the absence of traffic for a certain period of time, the STA enters power saving mode and stays in sleep mode as long as possible.

In order to implement such power saving modes, typically, the STA and the AP will negotiate their power saving capabilities during an association procedure. Such a negotiation procedure may include the following steps: the AP informs the STA whether it can support a STA working in power saving mode, and which type of power saving mode it can support. The STA will also inform the AP that whether it could work in power saving mode, and which kind of power saving mode it could support.

One example of a power saving mode is a duty cycle mode. If the STA decides to work in a duty cycle power saving mode, the STA initiates a procedure to negotiate the duty cycle parameters with its AP by sending a request frame to the AP. The request frame can include at least one of the following parameters: the start time of the first wake up window, the length of the wake up window (wake up window duration) and the interval between the start of two successive wake up window (wake up window interval). Upon receiving the request frame, the AP responds with a response frame to accept the STA's request, or allow the STA to enter duty cycle mode but provide different values for one or more parameters. The STA will enter duty cycle mode after finishing receiving the response frame.

FIG. 1 illustrates timing diagrams of AP power saving protocol (Tx) and a STA power saving protocol (Rx) when both the AP and STA clocks are synchronized with each other. As shown in FIG. 1, when the STA works in duty cycle power saving mode, the STA only wakes up at the beginning of each wake up window 101 (e.g., at times $t_0$ and $t_2$ in FIG. 1) and stays awake until the end of wake up window (e.g., time $t_1$). Thus, in FIG. 1, the duration of the negotiated wake up window is $t_1-t_0$ and the interval between two successive wake up windows is $t_2-t_0$. If no signal is received during the wake up window 101 from the AP or other STAs, the STA goes back to sleep. If a signal 103 transmitted by the AP is received during a wake up window 101, the STA remains awake and sends a response frame 105, for example a PS-Poll frame back to the AP. After receiving the PS-Poll frame 105, the AP sends buffered data 107 to the STA. Upon successfully receiving and decoding the data 107, the STA will send back an acknowledgment (ACK) frame 109 back to the AP. If no further communications are necessary, the STA will resume its negotiated power saving duty-cycle mode.

However, due to variability and tolerances of their respective internal clocks, it is possible that the clocks of the STA and the AP will lose synchronization with each other. FIG. 2 illustrates an example of a clock drift accumulation that can occur when the AP and STA clocks become out of synchronization with one another. In a BSS implementation, the AP typically functions as the timing master for any timed functions between the AP and the STA. As shown in FIG. 2, the AP can periodically (e.g., once every four wake up window intervals) transmit a beacon frame 201, which contains a value of a current timestamp to synchronize the timers of other STAs in the BSS. However, due to the clock drift of the STA and AP clocks, when the STA sleeps for quite a long time without communicating with the AP, the clock drift will accumulate. As shown in FIG. 2, the difference between the start of the wake up window 203 as determined by the AP's clock and the start of the wake up window 205 as determined by the STA clock increases (i.e., accumulates) at each successive wake up interval. Thus, when the AP sends the beacon frame 201 during the wake up window 203 starting at time $t_6$, but before the start of the STA's wake up window 205 at time $t_7$, the STA will not successfully receive the beacon frame 201 from the AP. Thus, the AP and STA will fail to synchronize with each other when operating in a power saving mode, and attempted communications between the AP and STA will be unsuccessful.

SUMMARY OF THE INVENTION

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while still remaining within the scope of the invention.

In accordance with one exemplary embodiment, a method performed by a first wireless node includes: determining a wake up window start time and duration for a second wireless communication node; and transmitting at least one signal to the second wireless communication node during the determined wake up window, the at least one signal comprising at least one synchronization sequence, wherein the at least one synchronization sequence is configured to enable the second wireless communication node to adjust its wake up window timing. In some embodiments, the first wireless communication node comprises an access point and the second wireless communication node comprises a station.

In another embodiment, a method performed by a first wireless communication node includes: determining a wake up window start time and duration; and receiving at least a portion of at least one signal during the determined wake up window, wherein the at least one signal is transmitted by a second wireless communication node and comprises at least one synchronization sequence, wherein the at least one synchronization sequence is configured to enable the first wireless communication node to adjust its wake up window timing. In some embodiments, the first wireless communication node comprises a station and the second wireless communication node comprises an access point.

In a further embodiment, a first wireless communication node includes: a processor configured to determine a wake up window start time and duration for a second wireless communication node; and a transmitter coupled to the processor, wherein the processor controls the transmitter to transmit at least one signal to the second wireless communication node during the determined wake up window, the at least one signal comprising at least one synchronization sequence, wherein the at least one synchronization sequence is configured to enable the second wireless communication node to adjust its wake up window timing.

In yet another embodiment, a first wireless communication node includes: a processor configured to determine a wake up window start time and duration; and a receiver configured to wake up at the start time of the wake up window, and receive at least a portion of at least one signal during the determined wake up window, wherein the at least one signal is transmitted by a second wireless communication node and comprises at least one synchronization sequence, wherein the at least one synchronization sequence is configured to enable the first wireless communication node to adjust its wake up window timing.

BRIEF DESCRIPTION OF THE DRAWINGS

Various exemplary embodiments of the invention are described in detail below with reference to the following Figures. The drawings are provided for purposes of illustration only and merely depict exemplary embodiments of the invention. These drawings are provided to facilitate the reader's understanding of the invention and should not be considered limiting of the breadth, scope, or applicability of the invention. It should be noted that for clarity and ease of illustration these drawings are not necessarily drawn to scale.

DETAILED DESCRIPTION OF EXEMPLARY EMBODIMENTS

Various exemplary embodiments of the invention are described below with reference to the accompanying figures to enable a person of ordinary skill in the art to make and use the invention. As would be apparent to those of ordinary skill in the art, after reading the present disclosure, various changes or modifications to the examples described herein can be made without departing from the scope of the invention. Thus, the present invention is not limited to the exemplary embodiments and applications described and illustrated herein. Additionally, the specific order or hierarchy of steps in the methods disclosed herein are merely exemplary approaches. Based upon design preferences, the specific order or hierarchy of steps of the disclosed methods or processes can be rearranged while remaining within the scope of the present invention. Thus, those of ordinary skill in the art will understand that the methods and techniques disclosed herein present various steps or acts in a sample order, and the invention is not limited to the specific order or hierarchy presented unless expressly stated otherwise.

Figure 3:
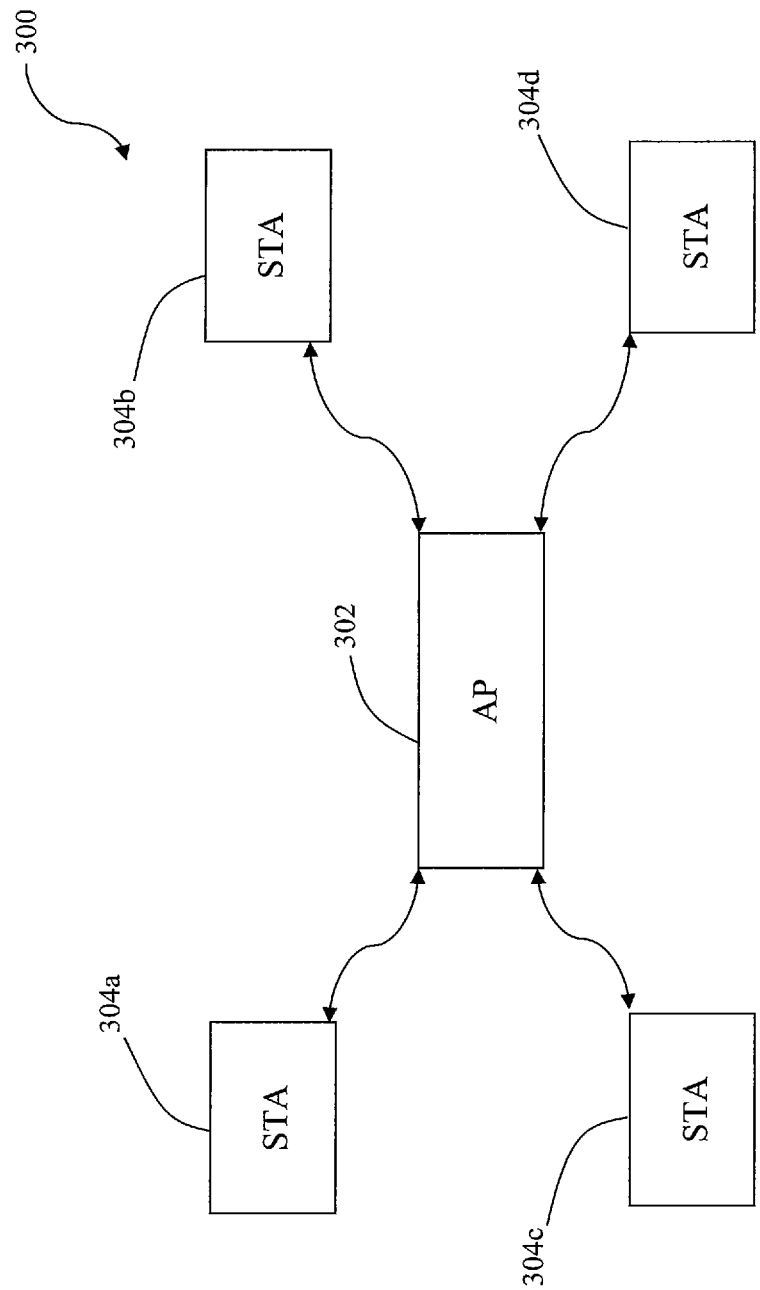
FIG. 3 illustrates a block diagram of an exemplary communication network environment in which the present invention can be practiced, in accordance with some embodiments of the invention.

FIG. 3 illustrates an exemplary wireless environment in which one or more embodiments of the invention can be practiced. As shown in FIG. 3, a wireless local area network (WLAN) 300 includes at least one access point (AP) 302 and a plurality of stations (STA's) 304a, 304b, 304c and 304d, which are communicatively coupled to the AP 302. Although various aspects of the invention are described herein in the context of a WLAN environment, it is understood that the invention may be practiced in any communication environment in which two or more nodes can communicate with each other when at least one of the nodes is operating in a duty cycle power saving mode. Examples of such alternative environments include a wide area network (WAN), metropolitan area network (MAN), local area network (LAN), a neighborhood aware network (NAN), and a personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g., Internet protocol suite, SONET (Synchronous Optical Networking), Ethernet, etc.).

Referring again to the exemplary environment of FIG. 3, a WLAN 300 can be used to interconnect nearby devices employing known networking protocols. However, various embodiments can employ any communication standard to transmit data between two or more nodes. In some embodiments, the AP 302 can serve as a hub or base station for the WLAN 300 and the STA's 304a-304d can be various types of devices capable of operating in a power-saving mode and having a communication module. For ease of discussion, when referring to any one of STA's 304a-304d, the singular term "STA 304" will be used herein. Examples of STA 304 include devices that include a communication module capable of operating in a power saving mode, and further include any one of various sensors that can measure any operational or environmental parameter (e.g., temperature, pressure, motion, speed, acceleration, ambient light, proximity, voltage, current, image/camera, etc.). In alternative embodiments, the STA 304 can be a laptop computer, a personal digital assistant (PDA), a mobile phone, etc. In some embodiments, the STA 304 can establish a communication link with the AP 302 via a Wi-Fi protocol (e.g., IEEE 802.11 protocol) to obtain connectivity to the Internet or other networks. In some embodiments, the STA 304 can also perform some or all of the functions of the AP 302 and communication with other STA's when employed in an ad-hoc network, for example.

In various embodiments, the AP 302 can include, or be implemented as, a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other communication node configured to perform the synchronization functions described herein. The term "configured for" or "configured to" as used herein with respect to a specified operation or function refers to a device, component, circuit, structure, machine, etc. that is physically constructed, programmed and/or arranged to perform the specified operation or function.

Various processes and methods can be used for transmissions in the wireless communication network 300 between the AP 302 and the STA 304, and between two STA's 304a and 304b, for example. For example, signals can be sent and received in accordance with OFDM/OFDMA techniques, or CDMA techniques.

Figure 4:
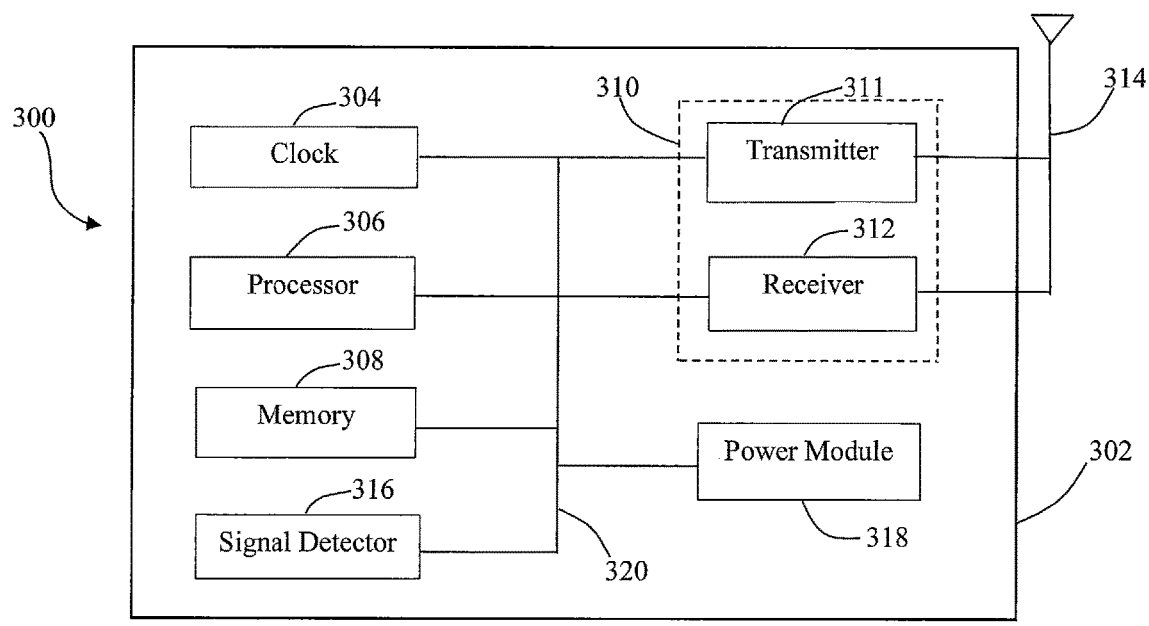
FIG. 4 illustrates a block diagram of an access point, in accordance with some embodiments of the invention.

FIG. 4 illustrates a block diagram of the AP 302, in accordance with some embodiments. The AP 302 is an example of a device that can be configured to implement the various methods described herein. The AP 302 includes a housing 400 containing a system clock 401, a processor 403, a memory 405, a transceiver 406 comprising a transmitter 407 and receiver 409, a signal detector 411, and a power module 413.

The system clock 401 provides the timing signals to the processor 403 for controlling the timing of all operations of the AP 302. The processor 403 controls the general operation of the AP 302 and can include one or more processing circuits or modules such as a central processing unit (CPU) and/or any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable circuits, devices and/or structures that can perform calculations or other manipulations of data. As described in further detail below, the processor 403 also controls and executes a synchronization procedure to enable the AP 302 to become synchronized with one or more STA's 304 that are operating in a duty cycle power-saving modem, in accordance with various embodiments of the invention.

The memory 405, which can include both read-only memory (ROM) and random access memory (RAM), can provide instructions and data to the processor 403. A portion of the memory 405 can also include non-volatile random access memory (NVRAM). The processor 403 typically performs logical and arithmetic operations based on program instructions stored within the memory 405. The instructions (a.k.a., software) stored in the memory 405 can be executed by the processor 403 to perform the methods described herein. The processor 403 and memory 405 together form a processing system that stores and executes software. As used herein, "software" means any type of instructions, whether referred to as software, firmware, middleware, microcode, etc. which can configure a machine or device to perform one or more desired functions or processes. Instructions can include code (e.g., in source code format, binary code format, executable code format, or any other suitable format of code). The instructions, when executed by the one or more processors, cause the processing system to perform the various functions described herein.

The transceiver 406, which includes the transmitter 407 and receiver 409, allows the AP 302 to transmit and receive data to and from a remote device (e.g, STA 304). An antenna 410 is typically attached to the housing 401 and electrically coupled to the transceiver 406. In various embodiments, the AP 302 include (not shown) multiple transmitters, multiple receivers, multiple transceivers, and/or multiple antennas. The transmitter 407 can be configured to wirelessly transmit packets having different packet types or functions, such packets being generated by the processor 403. Similarly, the receiver 409 is configured to receive packets having different packet types or functions, and the processor 403 is configured to process packets of a plurality of different packet types. For example, the processor 403 can be configured to determine the type of packet and to process the packet and/or fields of the packet accordingly.

In accordance with some embodiments, the AP 302 can also include the signal detector 411, which can be used to detect and quantify the level of signals received by the transceiver 406. The signal detector 411 can detect and quantify such parameters as total energy, energy per subcarrier per symbol, power spectral density and other signals. The power module 413 can include a power source such as one or more batteries, and a power regulator, to provide regulated power to each of the above-described modules 403, 405, 406 (407 and 409) and 411. In some embodiments, if the AP 302 is coupled to a dedicated external power source (e.g., a wall electrical outlet), the power module 413 can include a transformer and a power regulator.

The various modules discussed above are coupled together by a bus system 415. The bus system 415 can include a data bus and, for example, a power bus, a control signal bus, and/or a status signal bus in addition to the data bus. It is understood that the modules of the AP 302 can be operatively coupled to one another using any suitable techniques and mediums.

Although a number of separate modules or components are illustrated in FIG. 4, persons of ordinary skill in the art will understand that one or more of the modules can be combined or commonly implemented. For example, the processor 403 can implement not only the functionality described above with respect to the processor 403, but also implement the functionality described above with respect to the signal detector 411. Conversely, each of the modules illustrated in FIG. 4 can be implemented using a plurality of separate components or elements.

Figure 5:
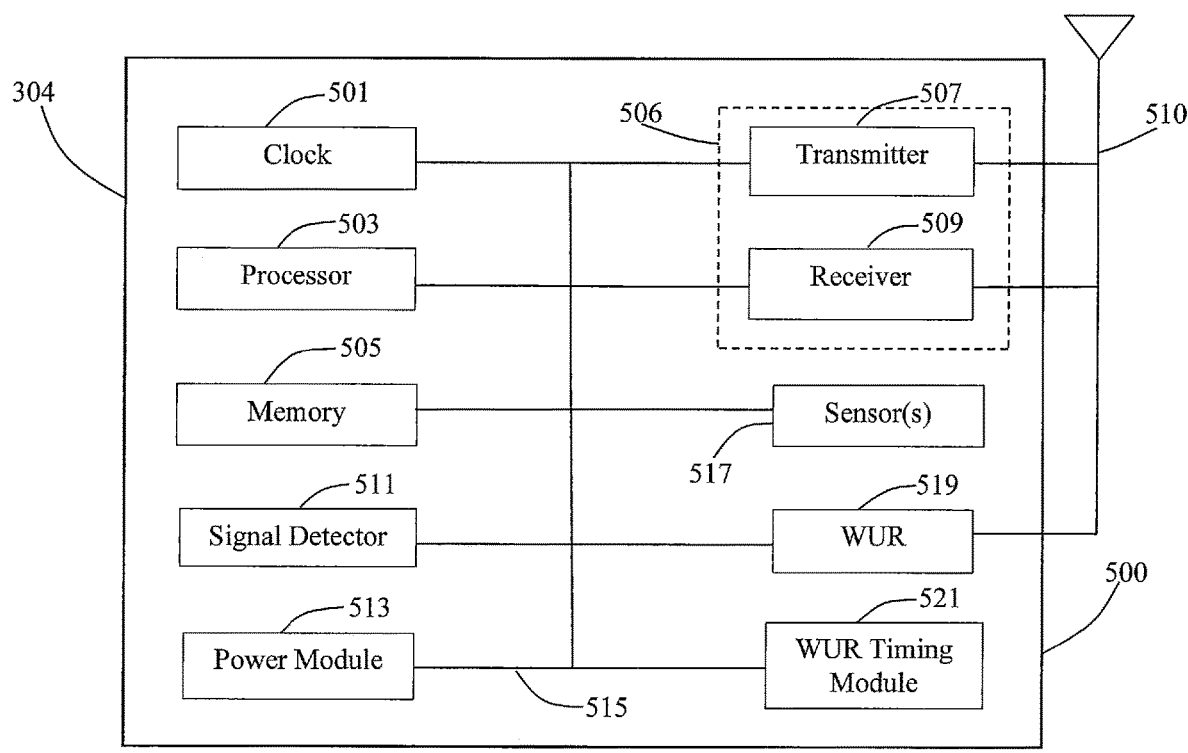
FIG. 5 illustrates a block diagram of a station, in accordance with some embodiments of the invention.

FIG. 5 illustrates a block diagram of the STA 304, in accordance with some embodiments of the invention. As shown in FIG. 5, the STA 304 can include a housing 500, which contains a system clock 501, a processor 503, a memory 505, a transceiver 506 comprising a transmitter 507 and a receiver 509, an antenna 510, a signal detector 511, a power module 513, and a system bus 515. Each of these components or modules can be similar or identical to the respective corresponding components 401, 403, 405, 406, 407, 409, 410, 411, 413 and 415 discussed above with respect to the AP 302 shown in FIG. 4. Therefore, for the sake of brevity, descriptions of these components or modules are not repeated.

As shown in FIG. 5, in accordance with some embodiments, the STA 304 can further include one or more sensors 517, a wake up receiver (WUR) 519 and a WUR timing module 521, which are operatively coupled to one another and the other modules discussed above via the system bus 515. The one or more sensors 517 can include any desired sensor for sensing any one or more desired operational or environmental parameters such as pressure, temperature, moisture, speed, acceleration, distance traveled, power, voltage, current, etc. Upon sensing such parameters, the STA 304 can communicate measured parameter values to the AP 302, which can then relay them via the internet, for example, to a central server or system for further processing and or action based on the measure parameter values. In this way, the STA 304 can be one of a multitude of devices or nodes that can be coupled to one another and/or a central server or system via the Internet to implement an IoT application, as discussed above.

The WUR 519 is an additional receiver besides the main receiver 509, whose task is to wake up the main transceiver 506, and any other modules such as modules 503, 505, 511, 513, 517, shown in FIG. 5 that may be asleep, when there is a request for communication from another node (e.g., AP 302) in the wireless network 300. The WUR 519 is coupled to the antenna 510 and periodically wakes up during a predetermined during of time (i.e., defined by a wake up window) to check for a signal transmitted by the AP 302 during pre-negotiated wake up windows. Thus, the WUR 519 allows the main transceiver 506 and some or all of the other modules 503, 505, 511, 513, 517, to stay in a sleep mode (e.g., powered down or reduced power mode) when the STA 304 is idle (i.e., does not need to transmit or receive data to or from another node). Additionally, the WUR 519 requires less power than the main transceiver 506 when they are performing their respective operations. In this way, the WUR 519 enables conservation of power expended by the STA 304. To further conserve power and/or prolong battery life, if the power module 513 comprises a battery power source, the WUR 519 can operate in a duty cycle power-saving mode, as described above.

Figure 1:
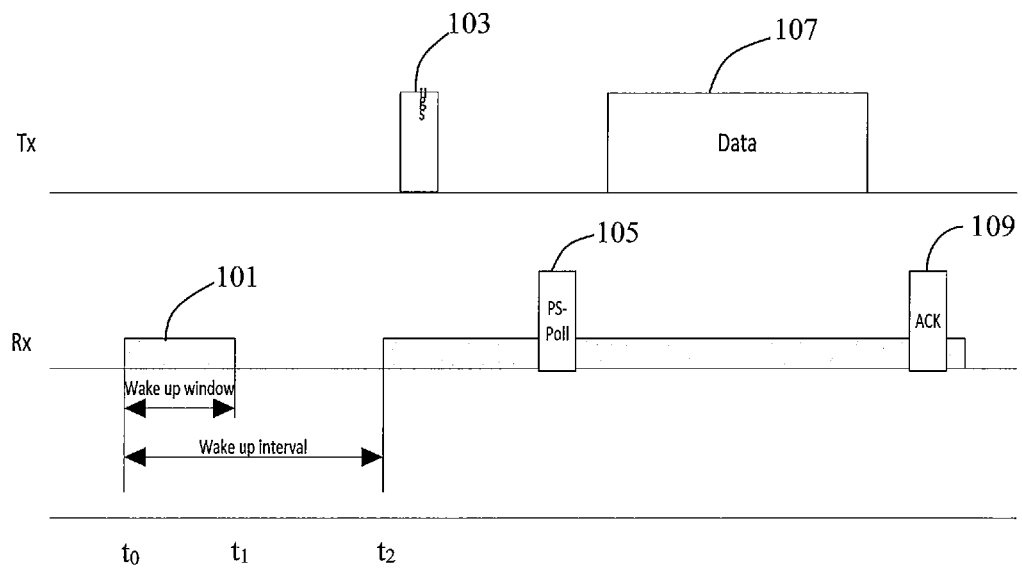
FIG. 1 illustrates a timing diagram of a conventional duty cycle power saving protocol between two wireless communication nodes.

The WUR timing module 521 is coupled to the system clock 501 and controls the duty cycle power-saving operation of the WUR 519. The WUR timing module 521 wakes up the WUR 519 at the beginning of each negotiated wake up window 101 (FIG. 1) and thereafter commands the WUR 519 to resume sleep mode (e.g., powered down or reduced power mode) at the end of each wake up window 101, repeating this sequence at the beginning of each negotiated wake up window. In some embodiments, the WUR timing module 521 may be integrated as part of the processor 503. In alternative embodiments, the WUR timing module may be a separate processing module that performs wake up window adjustments, as described in further detail below, while the main processor 503 and transceiver 506 remain in sleep mode. Thus, the WUR timing module 521 enables the STA 304 to perform wake up window timing adjustments so that the wake up windows of the STA 304 can be synchronized with the wake up windows of the AP 302.

Figure 2:
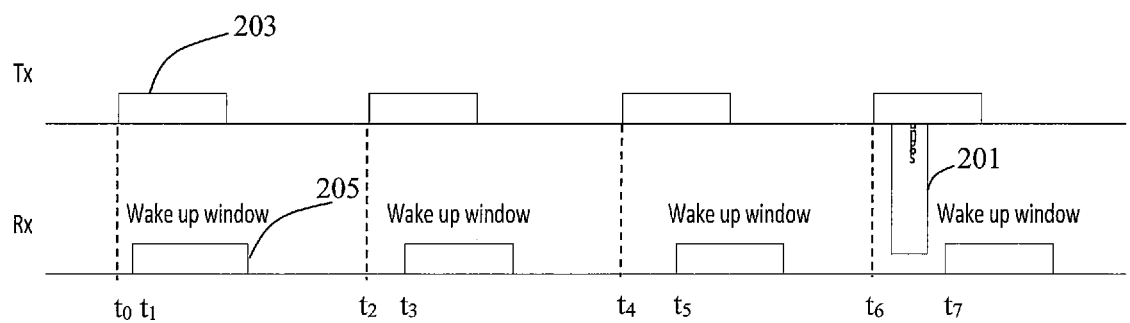
FIG. 2 illustrates how time drift accumulation can occur between two wireless communication nodes.

As discussed above, in order to conserve power (e.g., battery power) two or more nodes of a network can synchronously communicate with each other in accordance with negotiated wake up window start times, durations and intervals. In other words, the nodes can periodically wake from a sleep state to periodically transmit and/or receive synchronization messages and discovery messages. Of course, it is advantageous if the nodes can stay in sleep mode as long as possible without losing synchronization with each other. In the exemplary embodiments shown in FIGS. 3-5, the AP 302 will only send wake up signals to the STA 304 within negotiated wake up windows. The WUR module 519 of the STA 304 will wake up at the start of the negotiated wake up window to receive the wake up signal from the AP 302. However, if the respective clocks of the AP 302 and STA 304 are slow or fast with respect to one another, their respective wake up windows will become temporally misaligned, and this misalignment (i.e., clock drift) will increase with time as the WUR 519 remains in sleep mode. This increasing misalignment between the respective wake up windows, as illustrated and described with respect to FIG. 2 above, is referred to herein as "clock drift accumulation." Exemplary techniques to correct or compensate for this clock drift accumulation are described in detail below.

Figure 6:
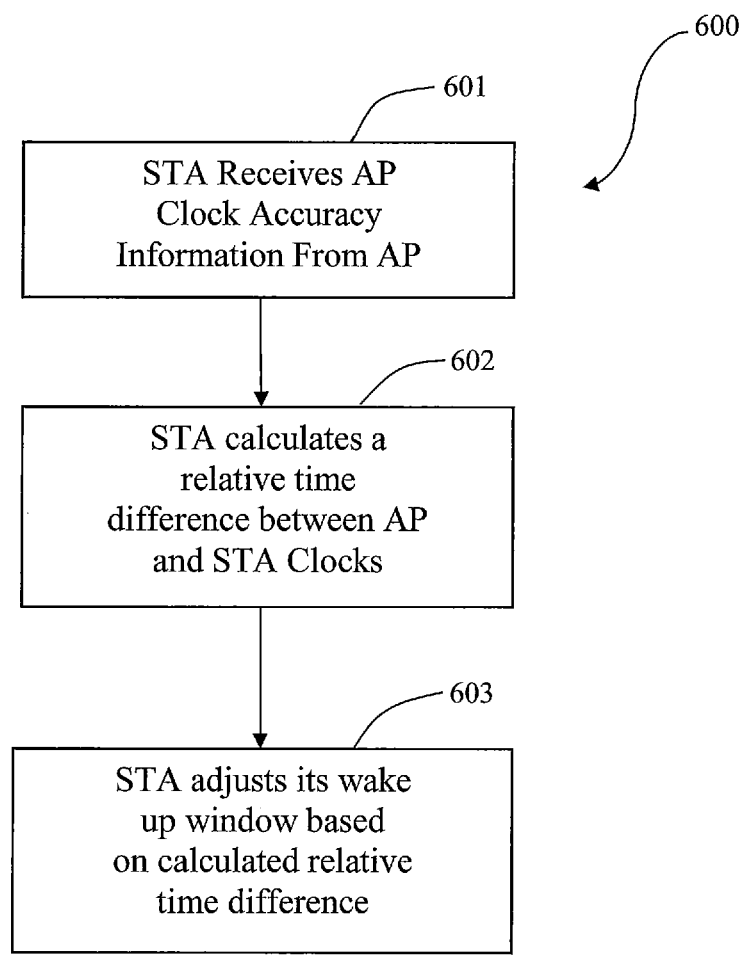
FIG. 6 illustrates a flow chart for a method of adjusting a wake-up window, in accordance with some embodiments of the invention.

FIG. 6 illustrates a method 600 for compensating for clock drift accumulation implemented by the AP 302 and STA 304 of FIGS. 3-5, in accordance with one embodiment of the invention. At step 601, during an association procedure, or during a duty cycle power-saving mode negotiation procedure, the STA 304 receives AP 302 clock accuracy information transmitted by the AP 302. At step 602, the STA 304 calculates a relative clock difference between the AP 302 and itself at a particular time based at least on the following parameters: its clock accuracy information, the AP 302 clock accuracy information, the time elapsed since the last calibration until the start of the current calibration operation. At step 603, the STA 304 will adjust a wake up window start times and/or end time based on the calculated relative clock difference.

The clock oscillators 401 and 501 in the AP 302 and STA 304, respectively, generally have a nominal clock rate along with a tolerance range within which the clock rate is essentially guaranteed to remain over temperature variations, aging, and the like, such as, a 1 MHz nominal rate plus or minus (+/−) 20 parts per million (ppm). Because each clock rate of each device may vary within its tolerance range, time synchronization between the devices will be lost due to clock drift accumulation becoming too large between successive wake up window adjustment/calibration operations.

In accordance with various embodiment, the calibration operation performed by the STA 304 can be performed during or outside of its wake up window. For example, in accordance with the method 600 described above, the AP 302 informs the STA 304 that the AP 302 clock accuracy is ±20 ppm, the STA 304's clock accuracy is 40 ppm. Thus, the STA 304 can calculate a maximum time difference between itself and the AP 302 will be ±60 microseconds (μs) after 1 second. If the STA 304 performs a calibration operation every 10 seconds, the maximum relative time difference will be ±0.6 milliseconds (ms). Based on this relative time difference, the STA 304 adjusts its wake up window start time to start 0.6 ms early and/or end time to end 0.6 ms late, every 10 seconds.

Figure 7:
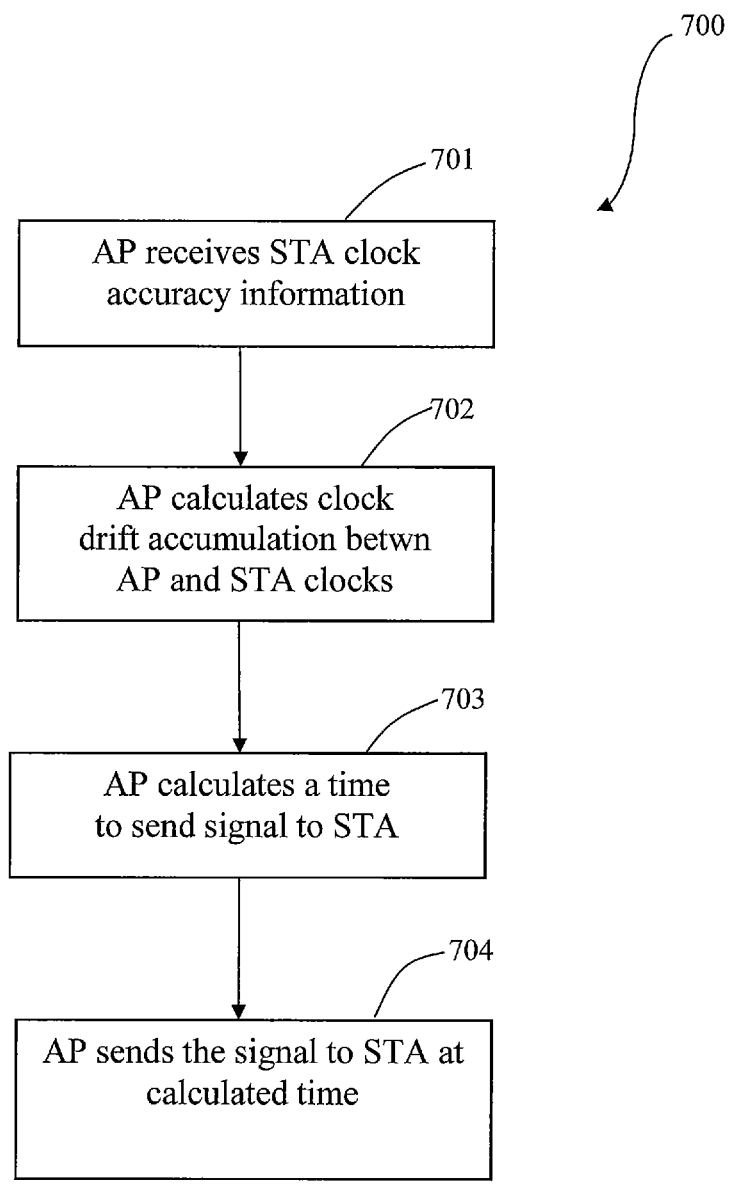
FIG. 7 illustrates a flow chart for method of sending a signal at a calculated time, in accordance with some embodiments of the invention.

FIG. 7 illustrates a method 700 for compensating for clock drift accumulation implemented by the AP 302 and STA 304 of FIGS. 3-5, in accordance with another embodiment of the invention. At step 701, during an association procedure, or during a duty cycle power-saving mode negotiation procedure, the AP 302 receives STA 304 clock accuracy, which is transmitted to the AP 302 by the STA 304. At step 702, with at least the STA's clock accuracy information and the AP's clock accuracy information, the AP 302 calculates a clock drift accumulation as a function of time between the AP's clock and the STA's clock. At step 703, the AP 302 calculates a time to send a signal to the STA 304 based on the calculated clock drift accumulation. At step 704, the AP 302 sends the signal at the calculated time.

In one embodiment, for step 703, the AP 302 calculates the time to send the signal so that the signal is sent before a time difference between the clock 401 of the AP 302 and the clock 501 of the STA 304, as a result of clock drift accumulation, becomes larger than a calculated value. In one embodiment, the calculated value is the sum of (1) a first time period that the AP uses to contend for the medium to send the signal and (2) a second time period corresponding to a maximum portion (e.g., percentage) of a preamble of the signal that may be missed while still allowing the STA 304 to detect and decode the signal. In one embodiment, the AP 302 contends to send the signal at the start of the wake up window determined by the AP clock 401. The contention method may be an enhanced distributed channel access (EDCA) mechanism. The AP 302 may use a specific Access Category (AC) parameter set in the EDCA mechanism to contend the medium. The specific AC parameter set may be the highest AC parameter set, or a AC parameter set defined especially for the signal. Alternatively, the AP 302 may use a PIFS (point coordination function interframe space) to contend the medium to send the signal. The first time period is related to the contention method the AP 302 uses and can be thus can be estimated by the AP 302. The second time period depends on the length of the preamble and the sequence in the preamble used by the AP. Once the AP 302 uses a specific sequence as the preamble for the purpose of the signal recognition, the AP 302 knows how long the preamble should be received by the STA 304 to recognize the signal. As understood by persons of ordinary skill in the art, various preamble sequences of various lengths may be implemented, depending on the timing and operational characteristics and requirements of a particular application.

Figure 8:
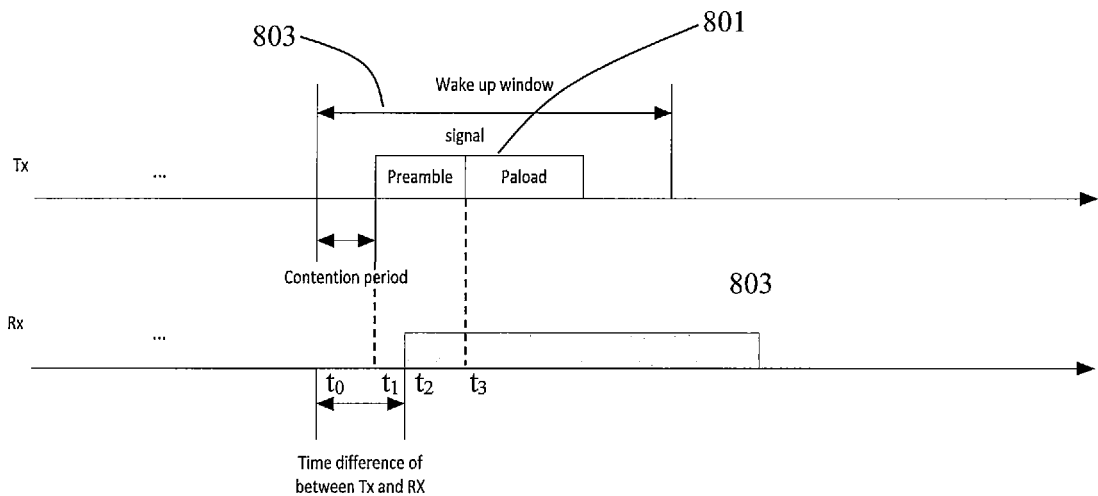
FIG. 8 illustrates a timing diagram for a method of sending at least one signal at a calculated time, in accordance with some embodiments of the invention.

FIG. 8 illustrates a timing diagram showing the transmission of a signal 801 within the determined wake up window 803 of the AP 302 before a calculated time, as described above. As shown in FIG. 8, the signal 801 is transmitted at a time $t_1$ which is before a difference between the start of the AP wake up window 803 and the start of the wake-window 805 of the STA 304 becomes greater than a contention period $(t_1-t_0)$ plus a second period $(t_2-t_1)$ corresponding to a maximum amount of the preamble of signal 801 that may be missed while still allowing the STA 304 to decode the signal 801 and process information (e.g., timing information) contained in the payload of the signal 801. As mentioned above, depending on the particular type of preamble sequence(s) and the length of the preamble, the AP 302 can determine the second time period (i.e., $t_2-t_1$), which corresponds to the time to transmit a first portion of the preamble that may be missed while still allowing the STA 304 to decode the preamble when only a second remaining portion of the preamble is received.

In accordance with various embodiments, when the signal transmitted by the AP 302 is successfully received and decoded by the STA 304, the signal is used to carry notification information and/or trigger the STA 304 to exit power saving mode. In some embodiments, the notification information includes timing information, such as a time stamp value or clock accuracy information, which may be used by the STA 304 to adjust its wake up window timing so that it is aligned with, or overlaps sufficiently with, the wake up window of the AP 302. For example, if the timing information is a current timestamp value of the AP 302, the STA 304 will replace its local timing in accordance with the timestamp value received in the signal. If the timing information is clock accuracy information, such as the current clock drift value associated with the clock 401 of the AP 302, the STA 304 corrects its local clock timing to compensate for this clock drift value.

In some embodiments, the signal transmitted by the AP 302 commands the STA 304 to calibrate its wake up window timing without exiting power saving mode. In such embodiments, the WUR timing module 521 is a separate module from the processor 503 and includes circuitry (e.g., logic circuitry and/or a microprocessor) to adjust the start and/or end times of the STA's wake up window. Alternatively, the signal can command the STA 304 to exit power saving mode, and then the AP 302 can send another signal containing the AP's timing information to the STA, which may be a data, control and/or management frame, for example. In this case, the timing information could be carried within the physical layer or Medium access layer part of the signal from the AP 302 to the STA 304. If the AP 302 receives a response frame (e.g., an ACK frame) from STA 304, in response to the signal, the AP 302 can assume that the STA 304 has performed a timing calibration successfully.

Figure 9:
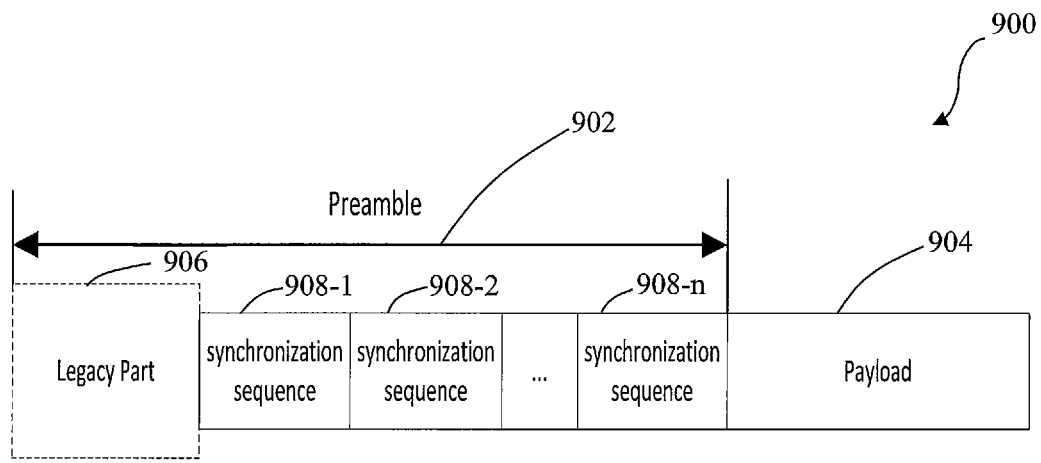
FIG. 9 illustrates an exemplary signal that may be transmitted, in accordance with some embodiments of the invention.

FIG. 9 shows an exemplary structure of a signal 900 transmitted by the AP 302 to the STA 304, in accordance with one embodiment of the invention. As shown in FIG. 9, the signal 900 includes a preamble 902 and a payload portion 904. The preamble 902 includes an optional legacy portion 906 and a plurality (n) of synchronization sequences 908-1 to 908-n. The signal may begin with a legacy preamble used to protect the following transmission. The legacy portion 906 can be docoded by legacy STAs (i.e., existing STAs at the time of filing of the present application) that are compliant, for example, with the 802.11a, 802.11ac, 802.11ax, etc. standards. The legacy portion 906, for example, informs the legacy STA's how long the wake up signal 900 will occupy the medium. As shown in FIG. 9, the preamble 902 contains a plurality synchronization sequences 908-1 to 908-n. In alternative embodiments, the preamble 902 may contain only one synchronization sequence 908-1. For ease of discussion, one or more of the synchronization sequences 908-1 to 908-n, may be referred to as synchronization sequence 908 or synchronization sequences 908. In various embodiments, one or more synchronization sequences 908 can be used by STA 304 to capture the signal 900 and decode the signal correctly even if the entire preamble 902 has not been received by the STA 304. In accordance with various embodiments, the synchronization sequence 908 can comprise a predetermined sequence of 1's and 0's that has a predetermined length to enable easy recognition and decoding by the STA 304.

In various embodiments, the AP 302 can predefine the number of synchronization sequences 908 in the preamble 902, or the AP 302 can notify the STA 304 of the number of synchronization sequences 908 during the power saving mode negotiation procedure, or alternatively, in the signal 900 itself. In another embodiment, the AP 302 can use a predefined stop sequence following the last synchronization sequence to indicate the end of the preamble 902. After the STA 304 receives and successfully decodes the signal 900, in some embodiments, the STA 304 uses timing information contained in the payload 904 to perform timing calibration, as discussed above.

Figure 10:
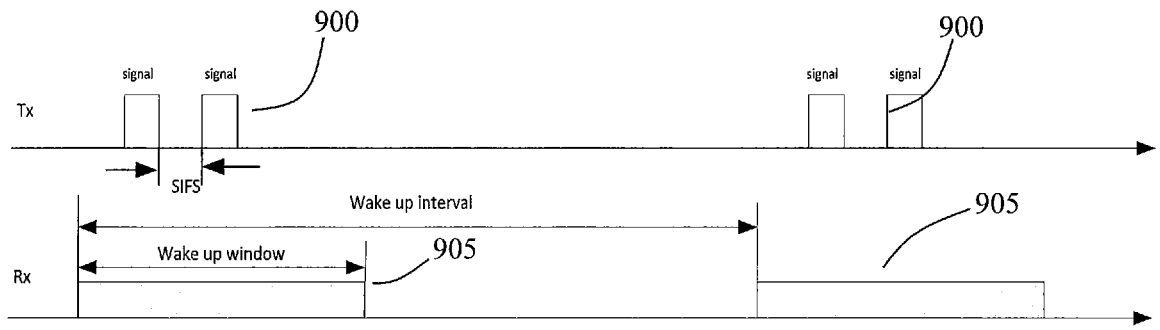
FIG. 10 illustrates a timing diagram for a method of sending a plurality of signals within a determined wake up window, in accordance with some embodiments of the invention.

In some embodiments, after the AP 302 contends to transmit the signal 900 successfully, the AP 302 may send the signal 900 one or more times during a wake up window, as shown in FIG. 10. In one embodiment, the interval between two successive signals 900 within a wake up window could be a short interframe space (SIFS). In various embodiments, each signal 900 can contain one or more synchronization sequences 908. In another embodiment, the AP 302 contends to send a synchronization sequence at the end of the wake up window. In one embodiment, a synchronization sequence set consists of several synchronization sequences and is predefined in the system. Each AP chooses one synchronization sequence from the set, and informs its associated STAs of the chosen synchronization sequence. In some embodiments, the AP should avoid choosing the same sequence as another AP. In other embodiment, a common synchronization sequence is used by all the AP's. In some embodiments, the synchronization sequence can be separate from a signal containing notification and/or timing information, and the synchronization sequence and the signal is transmitted at least one time in the wake up window. In various embodiments, the contention method to send the synchronization sequence may be an enhanced distributed channel access (EDCA) mechanism. The AP 302 may use a specific Access Category (AC) parameter set in the EDCA mechanism to contend the medium. For example, the specific AC parameter set may be the highest AC parameter set, or a AC parameter set defined especially for the signal. Alternatively, the AP 302 may use a PIFS (point coordination function interframe space) to contend the medium to send the synchronization sequence.

Figure 11:
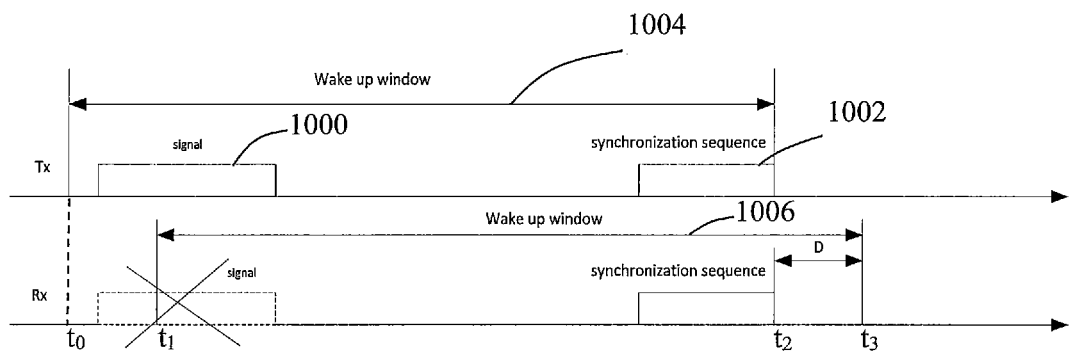
FIG. 11 illustrates a timing diagram for a method of sending at least one signal and at least one synchronization sequence within a determined wake up window, in accordance with some embodiments of the invention.

FIG. 11 illustrates a synchronization sequence sending method in accordance with one embodiment of the invention. As shown in FIG. 11, the AP 302 sends a signal 1000 and at least one synchronization sequence 1002 such that the last synchronization sequence 1002 ends at the boundary of the end of the wake up window 1004, as determined by the clock 401 of the AP 302. Although FIG. 11 shows only one synchronization sequence 1002 transmitted at the end of the wake up window 1004, one or more additional synchronization sequences (not shown) can be transmitted before the last synchronization sequence 1002 after the signal 1000. In accordance with various embodiments, the number of synchronization sequences can be predefined and shared during an association or negotiation procedure, or contained in the signal 1000 and/or synchronization sequence 1002 itself such that the STA 304 can be notified of the number of sequences sent during one wake up window. In some embodiments, each synchronization sequence contains a number indicating its position among the plurality of sequences that are sent during a wake up window. Based on this number, the STA 304 can determine when it has decoded the last sequence. In some embodiments, the number of the synchronization sequences is decided by the time remaining after the AP 302 completes contending for the medium until the end of the wake up window. In such embodiments, the AP 302 will determine how many synchronization sequences 1002 it can send such that the last synchronization sequence will reach the ending boundary of the wake up window.

As shown in FIG. 11, the wake up window 1004 as determined by the AP 302 starts at time $t_0$ and ends at time $t_2$. The wake up window 1006 as determined by the STA 304 lags the wake up window 1004 and starts at time $t_1$ and ends at time $t_3$. Even if the signal 1000 sent at the beginning of the wake up window 1004 is not successfully decoded by the STA 304 due to a clock drift accumulation indicated by $t_1-t_0$, the STA 304 can identify and determine that the last synchronization sequence 1002 ends at time $t_2$, which is aligned with the end of the wake up window 1004. The STA 304 then determines the difference D between the end of its wake up window 1006 ($t_3$) and the end of synchronization sequence 1002 (i.e., $t_2$), where $D=t_3-t_2$. Thus, the STA 304 can adjust the start of its wake up window by D for a future wake up window, which compensates for the clock drift accumulation between the clocks of the AP 302 and STA 304, respectively. Thus, the purpose of the synchronization sequence 1002 is to help the STA to calibrate its local clock timing even if a signal 1000 containing timing information is not successfully decoded. In alternative embodiments, the AP 302 can send one or more synchronization sequences 1002 during a wake up window 1004 without also sending the signal 1000. Thus, in such embodiments, the STA 304 relies only on the one or more synchronization sequences 1002 to calibrate its timing. In alternative embodiments, the AP 302 sends a signal 1000 without timing information, and the STA 304 relies on the one or more synchronization sequences 1002 to calibrate its timing. In alternative embodiments, the AP 302 sends a signal 1000 with timing information, the STA 304 successfully decodes the signal 1000, but the accuracy of the timing information is more rough than the accuracy provided by the synchronization sequences 1002, after decoding the signal 1000. Thus, the STA 304 can also use the synchronization sequences 1002 to perform a more precise timing alignment.

Figure 12:
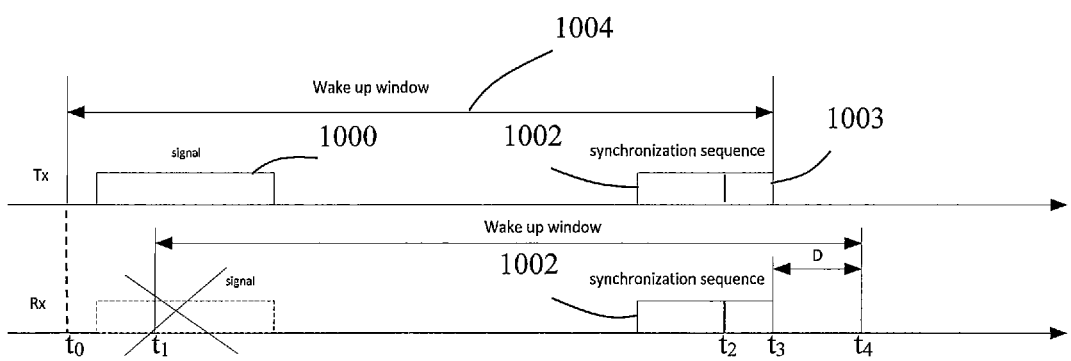
FIG. 12 illustrates a timing diagram for a method of sending at least one signal, at least one synchronization sequence and at least one symbol within a determined wake up window, in accordance with some embodiments of the invention.

FIG. 12 illustrates a synchronization sequence sending method in accordance with a further embodiment of the invention. The method of FIG. 12 is similar to the method of FIG. 11 described above, except that one or more symbols 103 is transmitted immediately after the last synchronization sequence 1002, where the end of the symbols 1003 indicates the end of the wake up window 1004 as determined by the AP 302. Thus, the one or more symbols 1003 fills the gap between the end of the last synchronization sequence 1002 ($t_2$) and the end boundary of the wake up window 1004 ($t_3$). In some embodiments, one or more synchronization sequences 1002 are sent by the AP 302 after medium contention is successfully completed until the end of the wake up window. If there is still gap between the end of the last sequence and the end of the window, but the gap is not large enough to send a complete synchronization sequence 1002, the AP 302 sends one or more symbols 103 to reach the ending boundary of the wake up window.

In some embodiments, information beared by the symbols could be a series of 1's ending with a 0, or could be a series of 0's ending with a 1. Various coding and modulation techniques can be applied to the information. For example, in some embodiments, the symbols are coded and modulated by ON-Off-Keying (OOK) modulation. In some embodiments, a logic value of 1 is represented by one ON symbol (High level) and a logic value of 0 is represented by one OFF symbol (Low level). In other embodiments, a logic value of 1 is represented by two ON symbols and a logic value of 0 is represented by two OFF symbols. In some embodiments, a logical 1 is represented by one ON symbol and one OFF symbol and a logical 0 is represented by one OFF symbol and one ON symbol. In some embodiments, the one or more symbols 1003 are padded to fill the gap and indicate the boundary of the of the wake up window 1004 to the STA 304. After determining the end of the one or more symbols at $t_3$, the STA 304 can adjust its wake up window according to the difference between the end of its wake up window 1006 at $t_4$ and the end of symbols 1003 at $t_3$, which is shown as D in FIG. 12. In some embodiments, the synchronization sequence 1002 need not be transmitted during every wake up window 1004. Rather, it can be transmitted periodically, and the period can be the same as or different from the negotiated wake up interval, in accordance with various embodiments.

In some embodiments, if the STA 304 has decoded the signal 1000 successfully, and timing information is carried in the signal 1000, the STA 304 ignores the one or more synchronization sequences 1002 and/or the symbols 1003. In alternative embodiments, the AP sends only the one or more synchronization sequences 1002 and/or the one or more symbols 1003, without send the signal 1000. In these latter embodiments, the STA 304 relies only on the one or more synchronization sequences 1002 and/or the one or more symbols 1003 to calibrate its wake up window, as described above. In alternative embodiments, the AP 302 sends a signal 1000 without timing information, the STA 304 relies on the one or more synchronization sequences 1002 and/or the one or more symbols 1003 to calibrate its timing. In alternative embodiments, the AP 302 sends a signal 1000 with timing information, the STA 304 successfully decodes the signal 100, but the accuracy of the timing information is more rough than the accuracy provided by the synchronization sequences 1002 and/or the one or more symbols 1003, after decoding the signal 1000. Thus, the STA 304 can also use the synchronization sequences 1002 and/or the one or more symbols 1003 to refine the timing alignment. In some further embodiments, the synchronization sequences 1002 may be contained in none null data packet, or in separate null data packets. A null data packet means a physical layer (PHY) protocol data unit (PDU) that carries no Data field.

Figure 13:
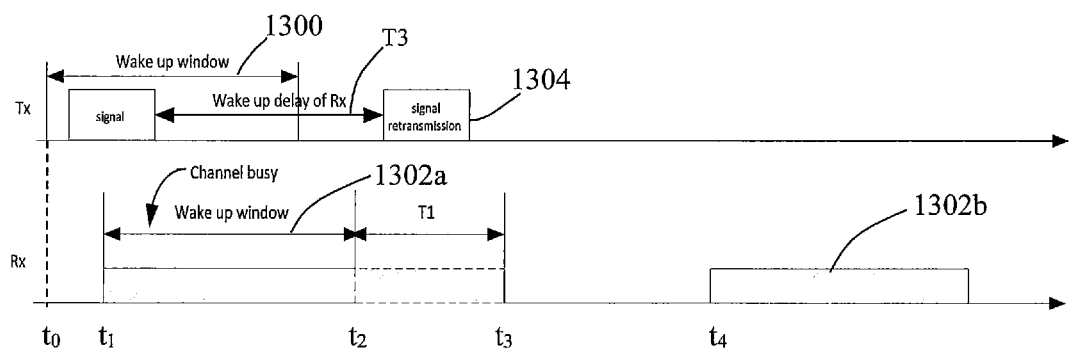
FIG. 13 illustrates a timing diagram for a method of adjusting a wake up window, in accordance with some embodiments of the invention.

FIG. 13 illustrates a method of adjusting the duration of a STA's wake up window to compensate for clock drift accumulation, in accordance with a further embodiment of the invention. As shown in FIG. 13, a wake up window 1300 as determined by the AP 302 starts at time $t_0$, while a wake up window 1302 according to the STA 304 clock starts at time $t_1$ after a signal 1304 has been transmitted by the AP 302. Due to this clock drift accumulation, if the STA 304 has not detected the signal 1304 but the result of a channel detection is busy, at the end of the wake up window 1302 according to the STA 304 clock, the STA continues listening for a predetermined extended period of time T1, in order to capture a retransmission of the signal 1304 before the start of the next wake up window. If no signal is received during T1, the STA 304 returns to sleep, until the start time of the next wake up window 1302b. In some embodiments, the predetermined time T1 may be equal to the clock drift accumulation D, which can be determined as discussed above with respect to FIGS. 11 and 12. In some embodiments, the AP 302 transmits the signal to the STA and the signal requests a response frame. If no response frame is received after a predetermined time T3 has elapsed, the AP 302 retransmits the signal 1304 to the STA 304. The predetermined T3 is no less than the time required by the STA 304 to wake up its main transceiver.

Figure 14:
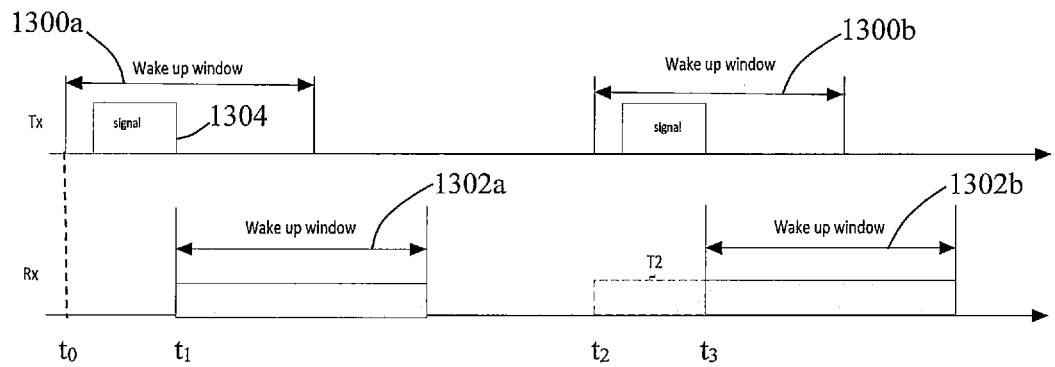
FIG. 14 illustrates a timing diagram for another method of adjusting a wake up window, in accordance with some embodiments of the invention.

FIG. 14 illustrates a method of adjusting the start time of a subsequent wake up window, in accordance with a further embodiment of the invention. As shown in FIG. 14, if the STA 304 has not detected the signal 1304 or the result of a channel detection is idle in a current wake up window 1302a, or in the current window plus an extended time period T1 (FIG. 13), the STA 304 wakes up ahead of the start time of the next wake up window 1302b by a predetermined amount of time T2. In some embodiments, the predetermined time T2 may be equal to the clock drift accumulation D, which can be determined as discussed above with respect to FIGS. 11 and 12.

In accordance with various embodiments, the detection of whether a channel is busy or idle can be performed by means of physical carrier sensing or virtual carrier sensing. Physical carrier sensing refers to the physical layer (PHY) determining the current state of use of the wireless medium (WM), while virtual carrier sensing refers to the MAC layer determining a current state of the use of the wireless medium. In some embodiments, if at least one of a physical carrier sensing and a virtual carrier sensing is busy, this means the channel detection result is busy. If both physical carrier sensing and virtual carrier sensing is idle, this means the channel detection result is idle.

In a further embodiment, if the result of channel detection is busy for N1 consecutive wake up windows but the signal decoding has failed, the STA 304 sends a request frame to the AP 302 and remains awake until it receives a response frame from the AP 302. In a further embodiment, if the result of channel detection is idle for N2 consecutive wake up windows, the STA 304 wakes up and sends a request frame to the AP 302 and remains awake until it receives a response frame from the AP 302. In various embodiments, N1 and/or N2 are predetermined integer numbers that may be equal to or different from each other. In various embodiments, the function of the request frame is one or more of the following: requiring the AP's timing information, checking if there is buffered data in the AP 302 awaiting to be sent to the STA 304, or reporting that the STA 304 is still reachable.

While various embodiments of the invention have been described above, it should be understood that they have been presented by way of example only, and not by way of limitation. Likewise, the various diagrams may depict an example architectural or configuration, which are provided to enable persons of ordinary skill in the art to understand exemplary features and functions of the invention. Such persons would understand, however, that the invention is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two, which can be designed using source coding or some other technique), various forms of program or design code incorporating instructions (which can be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware, firmware or software, or a combination of these technique, depends upon the particular application and design constraints imposed on the overall system. Skilled artisans can implement the described functionality in various ways for each particular application, but such implementation decisions should not be interpreted as causing a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method performed by a first wireless communication node, the method comprising:
  determining a wake up window start time and duration of a second wireless communication node;
  transmitting at least one signal to the second wireless communication node during the determined wake up window, the at least one signal comprising at least one synchronization sequence, wherein the at least one synchronization sequence is configured to enable the second wireless communication node to adjust its wake up window timing;

calculating a time to send the at least one signal during the determined wake up window based on a determined clock drift accumulation between clocks of the first wireless communication node and the second wireless communication node; and transmitting the at least one signal at the calculated time, wherein calculating a time comprises determining when a clock drift accumulation between the clocks of the first wireless communication node and the second wireless communication node will reach a certain value, and wherein the calculated time is a time before the clock drift accumulation reaches the certain value, and wherein the certain value is determined based on a contention time period used by the first wireless communication node to contend for a medium to send the at least one signal and a predetermined time period corresponding to an amount of time required to transmit a portion of a preamble of the at least one signal that can be missed by the second wireless communication node while allowing the second wireless communication node to decode the at least one signal.

2. The method of claim 1, wherein transmitting the at least one signal comprises transmitting the at least one synchronization sequence at the end of the determined wake up window.

3. The method according to claim 2, wherein an end of the at least one synchronization sequence indicates an end of the determined wake up window.

4. The method of claim 2 further comprising transmitting at least one symbol after transmitting the at least one sequence, wherein the at least one symbol fills a gap between an end of the at least one synchronization sequence and an end of the determined wake up window.

5. The method of claim 1 wherein the at least one synchronization sequence is contained in a preamble of the at least one signal.

6. The method of claim 5 wherein the at least one synchronization sequence comprises a plurality of synchronization sequences contained in the preamble of the at least one signal.

7. The method of claim 5 wherein the at least one signal comprises a plurality of signals transmitted during the determined wake up window.

8. The method of claim 1 wherein the first wireless communication node comprises an access point and the second wireless communication node comprises a station.

9. The method of claim 1 wherein the at least signal contains timing information comprising at least one of a current time stamp and a clock drift value.

10. A method performed by a first wireless communication node, the method comprising:

determining a wake up window start time and duration;

receiving at least a portion of at least one signal during the determined wake up window, wherein the at least one signal is transmitted by a second wireless communication node and comprises at least one synchronization sequence, wherein the at least one synchronization sequence is configured to enable the first wireless communication node to adjust its wake up window timing;

receiving at least one symbol after receiving the at least one sequence, wherein the at least one symbol fills a gap between an end of the at least one synchronization sequence and an end of a wake up window as determined by the second wireless communication node;

determining an end time of the at least one symbol;

determining a difference between the end time of the at least one symbol and an end time of the determined wake up window; and adjusting a timing of a subsequent wake up window based on the determined difference.

11. The method of claim 10, further comprising:

determining an end time of the at least one synchronization sequence;

determining a difference between the end time of the at least one synchronization sequence and an end time of the determined wake up window; and adjusting a timing of a subsequent wake up window based on the determined difference.

12. The method of claim 10 wherein the at least one synchronization sequence is contained in a preamble of the at least one signal.

13. The method of claim 10 wherein the at least one synchronization sequence comprises a plurality of synchronization sequences contained in the preamble of the at least one signal.

14. The method of claim 10 wherein the at least one signal comprises a plurality of signals received during the determined wake up window.

15. The method of claim 10 wherein the first wireless communication node comprises a station and the second wireless communication node comprises an access point.

16. The method of claim 10 wherein the at least signal contains timing information comprising at least one of a current time stamp and a clock drift value.

17. A first wireless communication node, comprising:

a processor configured to determine a wake up window start time and duration of a second wireless communication node; and a transmitter coupled to the processor, wherein the processor controls the transmitter to transmit at least one signal to the second wireless communication node during the determined wake up window, the at least one signal comprising at least one synchronization sequence, wherein the at least one synchronization sequence is configured to enable the second wireless communication node to adjust its wake up window timing, wherein the processor is further configured to:

calculate a time to send the at least one signal during the determined wake up window based on a determined clock drift accumulation between clocks of the first wireless node and the second wireless node;

control the transmitter to transmit the at least one signal at the calculated time;

determine when a clock drift accumulation between the clocks of the first wireless communication node and the second wireless communication node will reach a certain value, and wherein the calculated time is a time before the clock drift accumulation reaches the certain value, wherein the certain value is determined based on a contention time period used by the first wireless communication node to contend for a medium to send the at least one signal and a predetermined time period corresponding to an amount of time required to transmit a portion of a preamble of the at least one signal that can be missed by the second wireless communication node while allowing the second wireless communication node to decode the at least one signal.

18. The first wireless communication node of claim 17, wherein the processor further controls the transmitter to transmit the at least one synchronization sequence at the end of the determined wake up window.

19. The first wireless communication node of claim 18, wherein an end of the at least one synchronization sequence indicates an end of the determined wake up window.

20. The first wireless communication node of claim 18, wherein the processor further controls the transmitter to transmit at least one symbol after transmitting the at least one sequence, wherein the at least one symbol fills a gap between an end of the at least one synchronization sequence and an end of the determined wake up window.

21. The first wireless communication node of claim 17, wherein the at least one synchronization sequence is contained in a preamble of the at least one signal.

22. The first wireless communication node of claim 21, wherein the at least one synchronization sequence comprises a plurality of synchronization sequences contained in the preamble of the at least one signal.

23. The first wireless communication node of claim 21, wherein the at least one signal comprises a plurality of signals transmitted during the determined wake up window.

24. The first wireless communication node of claim 17 wherein the at least signal contains timing information comprising at least one of a current time stamp and a clock drift value.

25. A first wireless communication node comprising:
a processor configured to determine a wake up window start time and duration; and
a receiver configured to wake up at the start time of the wake up window, and receive at least a portion of at least one signal during the determined wake up window, wherein the at least one signal is transmitted by a second wireless communication node and comprises at least one synchronization sequence, wherein the at least one synchronization sequence is configured to enable the first wireless communication node to adjust its wake up window timing,
wherein the receiver is further configured to receive at least one symbol after receiving the at least one sequence, wherein the at least one symbol fills a gap between an end of the at least one synchronization sequence and an end of a wake up window as determined by the second wireless communication node, and
wherein the processor is further configured to:
determine an end time of the at least one symbol;
determine a difference between the end time of the at least one symbol and an end time of the determined wake up window; and
adjust a timing of a subsequent wake up window based on the determined difference.

26. The first wireless communication node of claim 25, wherein the processor is further configured to:
determine an end time of the at least one synchronization sequence;
determine a difference between the end time of the at least one synchronization sequence and an end time of the determined wake up window; and
adjust a timing of a subsequent wake up window based on the determined difference.

27. The first wireless communication node of claim 25, wherein the at least one synchronization sequence is contained in a preamble of the at least one signal.

28. The first wireless communication node of claim 27, wherein the at least one synchronization sequence comprises a plurality of synchronization sequences contained in the preamble of the at least one signal.

29. The first wireless communication node of claim 27, wherein the at least one signal comprises a plurality of signals received during the determined wake up window.

30. The first wireless communication node of claim 25 wherein the at least signal contains timing information comprising at least one of a current time stamp and a clock drift value.

* * * * *